United States Patent
Koizumi

[11] 3,711,199
[45] Jan. 16, 1973

[54] VARIABLE FOCAL LENGTH OPTICAL SYSTEM FOR PHOTOCOPYING MACHINE

[75] Inventor: Yutaka Koizumi, Yokohama, Japan

[73] Assignee: Kabushiki Kaisha Ricoh, Tokyo, Japan

[22] Filed: Jan. 21, 1972

[21] Appl. No.: 219,885

Related U.S. Application Data

[63] Continuation of Ser. No. 14,288, Feb. 26, 1970, abandoned.

[30] Foreign Application Priority Data

Feb. 28, 1969 Japan.................44/15575

[52] U.S. Cl.................355/57, 355/60, 355/66
[51] Int. Cl..................................G03b 27/34
[58] Field of Search.........355/11, 44, 45, 55, 57, 60, 355/63, 69, 66; 95/4.5 J

[56] References Cited

UNITED STATES PATENTS

| | | |
|---|---|---|
| 2,160,277 | 5/1939 | Neidich................95/4.5 |
| 2,356,620 | 8/1944 | Schade.................95/4.55 |
| 3,076,392 | 2/1963 | Cerasani...............355/11 |
| 3,437,410 | 4/1969 | Tregay et al..........355/57 |
| 3,539,258 | 11/1970 | Miles..................355/66 |

Primary Examiner—Samuel S. Matthews
Assistant Examiner—Richard M. Sheer
Attorney—Erwin Koppel et al.

[57] ABSTRACT

A variable magnification optical system for a photocopying machine wherein a variable lens interposed between an original holder and a copy paper holder spaced apart from the original holder by a predetermined distance varies its focal length within its lens barrel and displaces itself along an optical path passing through a side edge of the original, whereby an image may be magnified or reduced in size with one side edge of a copy paper being a reference line for magnification or reduction.

1 Claim, 5 Drawing Figures

PATENTED JAN 16 1973   3,711,199

PRIOR ART FIG. 1A

VARIABLE FOCAL LENGTH OPTICAL SYSTEM FOR PHOTOCOPYING MACHINE

This is a continuation of application Ser. No. 14,288 filed Feb. 26, 1970.

BACKGROUND OF THE INVENTION

The present invention relates to a photocopying machine and more particularly a variable magnification optical system for a photocopying machine.

When the ratio of a distance from a photo lens to a subject to a distance from the photo lens to a sensitized film is considerably large as in the case of ordinary photography, an image may be varied in size only by displacing a lens within its lens barrel. In a photocopying machine since, a distance from an original to a copy paper is relatively shorter and the magnification power is almost unity, two or more parts of the projection lens must be displaced relative to each other within its lens barrel (the whole lens system) which in turn must be displaced for magnification or reduction in size of a projected image. When the lens is displaced along one optical axis or specifically selected light ray, an image projected upon a copy paper is enlarged or reduced around a point upon the copy paper. This means that four side edges of a projected image vary their positions as the size of the image is varied. This is one distinct disadvantage for a photocopying machine in which a copy paper is positioned for exposure with its one edge being aligned with a reference line.

SUMMARY OF THE INVENTION

One of the objects of the present invention is therefore to provide a variable magnification optical system for a photocopying machine in which a projection lens is displaced in the direction of a specifically selected light ray incident upon a reference point upon one side edge of a copy paper so that an image projected upon the copy paper may be enlarged or reduced in size with said one side edge being a reference line.

Another object of the present invention is to provide a variable magnification optical system best suited for a photocopying machine.

A further object of the present invention is to provide a variable magnification optical system simple in construction, compact in size, reliable in operation and inexpensive to manufacture.

In brief, a projection lens of the optical system in accordance with the present invention is displaced along a specifically selected light ray, for example, emanating from one side edge of an original and being incident upon a preselected line upon a copy paper holder with which is aligned one side edge of a copy paper for exposure. Consequently, irrespective of the position of the projection lens, one side edge of an enlarged or reduced image is always made in coincidence with the preselected line upon the copy holder, thereby facilitating the positioning of the copy papers for exposure in a photocopying machine.

The above and other objects, features and advantages of the present invention may become more apparent from the following description of one illustrative embodiment thereof taken in conjunction with the accompanying drawing.

DESCRIPTION OF THE PREFERRED EMBODIMENT

Figure 1B:
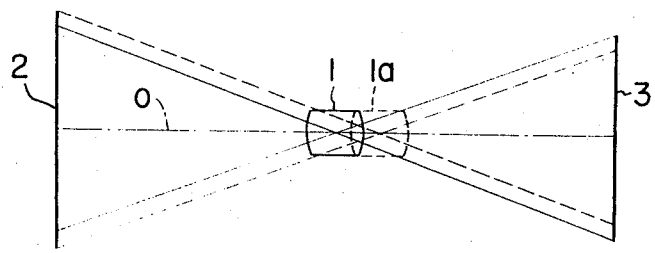
FIG. 1A and B are diagrammatic views for explanation of a variable magnification optical system for a photocopying machine.
Figure 1B:
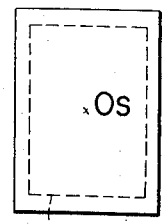
Figure 2A:
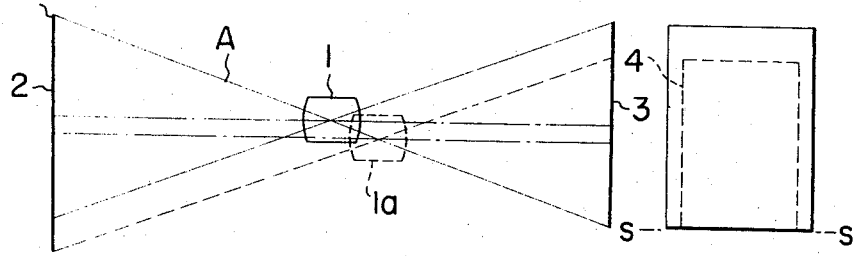
FIG. 2A and B are for explanation of a variable magnification optical system for a photocopying machine in accordance with the present invention.

In FIG. 1A and FIG. 2A, on one side of a variable focus length lens 1 is placed an original 2 to be copied while a sensitized paper or copying paper 3 is placed on the other side of the lens 1. When the focal length of the lens 1 is varied while the distance between the original 2 and the copying paper 3 remains constant, the magnification of the image projected upon the copying paper 3 may be varied.

In the optical system shown in FIG. 1A, the variable focus length lens 1 is so arranged as to be displaced from the unit reproduction or 1 : 1 (1 X) position to an enlargement or reduction position 1a designated by the dotted line in FIG. 1A, along its optical axis O. When the lens 1 is displaced along the optical axis O as described above, an image 4 reduced in size is obtained around a reference point Os at which the optical axis O intersects with the copying paper 3 at a right angle. In a photocopying machine, however, there arises one distinct disadvantage when an image is reduced symmetrically around the reference point at which the stationary optical axis intersects with the photocopying paper, that is the center of a copying paper holder, in view of the positioning of a copying paper upon the holder and of an original upon an original holder.

Figure 2B:
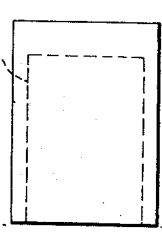

In view of the above, in the optical system shown in FIG. 2A, the lens 1 is displaced along an optical path A passing one end 2a of the original 2 so that as shown in FIG. 2B an image 4 may be reduced in size with the line s—s being a reference line. It is therefore readily understood that when one side edge of a copying paper is aligned with the stationary reference line irrespective of a size desired, the handling and positioning of both an original and a copying paper are much facilitated in operation, especially when a copying paper is advanced to an exposure section of a copying machine by means of a conveyor belt, a plurality of rollers or the like so that it is desired to automatically stop and held a copying paper at a predetermined position for exposure. The above described arrangement brings about much advantages in practice.

Figure 3:
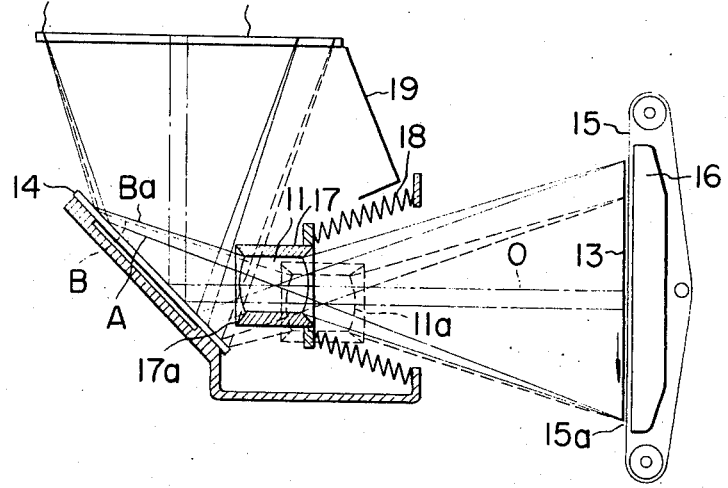
FIG. 3 is a schematic sectional view of a photocopying machine to which is applied the optical system of the present invention.

FIG. 3 shows one example of an exposure section of a photocopying machine embodying the present invention and having one reflecting mirror 14 interposed between an original holder 12 and a variable focus length lens 11. The original holder 12 is made of a transparent material. A copy paper 13 is firmly placed upon a suction belt 15 for transporting the copy papers wrapped around a vacuum box 16.

The lens barrel 17 of the lens 11 is carried by a guide rod (not shown) which is disposed in parallel with optical path A so that the lens 11 may be displaced along the optical path A when an image projected upon the copy paper 13 is enlarged or reduced in size. More particularly, when the lens 11 is displaced to the position 11a shown by the dotted line along the optical path A, the image projected upon the copy paper 13 is reduced in size. It should be noted, however, that both the point 15a upon the conveyor belt 15 and the point 12a upon the original holder 12 at which the optical path A intersects with the belt 15 and the original holder 12 respectively remains unchanged so that these points 12a and 15a may be advantageously used as reference points for positioning the copy papers and originals respectively. Thus, for example when the copy paper which is being advanced upon the belt 15 in the direction indicated by the arrow may be stopped when the leading edge of the copy paper 13 reaches the reference point 15a, the conveyor belt 15 is stopped for exposure of the copy paper 13. Irrespective of the magnification or reduction size, the leading edges of the copy papers may be stopped at the same position for exposure so that an automatic conveyor belt stopping device of the prior art may be used.

In order to obtain an image enlarged in size, the lens 11 may be displaced along the optical path A in the direction toward the reflecting mirror 14, that is the direction opposite to the point 11a. In FIG. 3 both of the optical path A and the reflecting mirror 14 are shown as being inclined downwardly relative to the optical axis O, so that the displacement of the lens barrel 17 is much facilitated. More particularly, the distance over which is displaced the peripheral side edge 17a of the lens barrel 17 until the latter contacts with the reflecting mirror 14 can be made longer than that of the case in which the lens barrel is displaced along the optical axis O. In other words, a photocopying machine can be made more compact in size because the distance between the reflecting mirror and the outermost position of the lens barrel may be reduced. There exists only a small deviation between the light ray B connecting the reference point 12a and the edge of the lens which is displaced to a magnification or reduction position and the light ray Ba when the lens 11 is placed at the 11a position, so that the reflecting mirror may be smaller in size than one used in a photocopying machine in which a lens barrel is displaced along the optical axis. It is noted that the reflecting mirror may be interposed between the lens and a copy paper as needs demand. Reference numeral 18 in FIG. 3 designates a light shielding member which may be extended and retracted; and 19, a shield for preventing the light emanated from a light source (not shown) from directly reaching the sensitized surface of a copy paper without passing through the projection system.

What is claimed is:

1. A variable magnification optical system having an optical axis for use in a photocopying machine comprising
    an original holder having a first reference line fixedly positioned in said machine and adapted to have an original placed thereon;
    a copy holder having a second reference line fixedly positioned in said machine and adapted to have a copy paper positioned thereon, said copy holder spaced a fixed distance along said optical axis from said original holder and located substantially at right angles with respect thereto;
    a mirror fixed in position and located between said original holder and said copy holder, said mirror mounted to be inclined with respect to said original holder and said copy holder to provide image reflection by light rays passing therebetween;
    a variable focus lens movably mounted between said original holder and said copy holder to focus the light rays for variable magnification;
    said original having an edge that is positioned and maintained on said first reference line on said original holder and providing an image that is directed along an optical path reflectable through said mirror and said variable focus lens to an edge on said copy paper that is positioned and maintained on said second reference line on said copy holder;
    said variable focus lens being movable to a first position on said optical axis to provide a 1:1 magnification of the image of the edge of said original directed along said optical path on said copy paper edge; and
    said variable focus lens being movable along a path inclined to said optical axis from said first position to a second position, said inclined path corresponding to a line passing through the first and second reference lines whereby the image of the edge of said original directed along said optical path is maintained on said second reference line of said copy holder and magnification of the image of the edge of said original is variable from said 1:1 magnification.

* * * * *